United States Patent
Tye et al.

(10) Patent No.: US 8,612,064 B2
(45) Date of Patent: Dec. 17, 2013

(54) HUMAN USER INTERFACE DEVICE WITH THERMAL CONTROLS

(75) Inventors: Trentent Tye, Calgary (CA); Troy Tye, St. Albert (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 287 days.

(21) Appl. No.: 12/864,129

(22) PCT Filed: Jan. 24, 2008

(86) PCT No.: PCT/US2008/051900
§ 371 (c)(1),
(2), (4) Date: Jul. 22, 2010

(87) PCT Pub. No.: WO2009/094030
PCT Pub. Date: Jul. 30, 2009

(65) Prior Publication Data
US 2010/0292865 A1 Nov. 18, 2010

(51) Int. Cl.
*G06F 1/20* (2006.01)
(52) U.S. Cl.
USPC .......................................... 700/300; 219/482
(58) Field of Classification Search
None
See application file for complete search history.

(56) References Cited

U.S. PATENT DOCUMENTS

| | | | |
|---|---|---|---|
| 5,023,459 A * | 6/1991 | Osborn et al. | 250/332 |
| 6,728,653 B1 | 4/2004 | Figueredo | |
| 7,133,726 B1 | 11/2006 | Atwood et al. | |
| 2002/0168937 A1 * | 11/2002 | Clark et al. | 455/41 |
| 2003/0123223 A1 * | 7/2003 | Pokharna et al. | 361/687 |
| 2007/0018959 A1 * | 1/2007 | Kwon et al. | 345/163 |
| 2007/0216646 A1 * | 9/2007 | Sun | 345/163 |

FOREIGN PATENT DOCUMENTS

| | | | |
|---|---|---|---|
| CN | 2672751 | * | 1/2004 |
| CN | 2672751 | | 1/2005 |
| KR | 10-2007-0116446 A | | 10/2007 |

OTHER PUBLICATIONS (Lin et al. CN-2672751, machine translation provided with 1st office action).*
Lin (CN-2672751, machine transalation provided with first OA).*

* cited by examiner

*Primary Examiner* — Hoai V Ho
*Assistant Examiner* — James G Norman

(57) ABSTRACT

A system, comprises a thermal electric cooler ("TEC") and a computer input device coupled to the TEC. The TEC is adapted to regulate a temperature of the computer input device via conduction.

15 Claims, 2 Drawing Sheets

HUMAN USER INTERFACE DEVICE WITH THERMAL CONTROLS

BACKGROUND

Gamers and other computer users that play or work for long stretches of time perspire. Some of this perspiration appears on the hand, causing discomfort and affecting ability to play or work at maximum ability or efficiency. Specifically, the ability to accurately and reliably time button presses is decreased. In the gaming context, the decreased ability results in the inability make a shot, move, or maneuver necessary to win the game. In the vocational context, the decreased ability results in wasted resources. Additionally, in high-stress fields, such as medicine and investment banking, an errant button press could have serious ramifications.

BRIEF DESCRIPTION OF THE DRAWINGS

For a more complete understanding of the present disclosure, reference is now made to the accompanying drawing and detailed description, wherein like reference numerals represent like parts.

NOTATION AND NOMENCLATURE

Certain terms are used throughout the following claims and discussion to refer to particular components. This document does not intend to distinguish between components that differ in name but not function. In the following discussion and in the claims, the terms "including" and "comprising" are used in an open-ended fashion, and thus should be interpreted to mean "including but not limited to." Also, the term "couple" or "couples" is intended to mean either an indirect or direct electrical or optical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
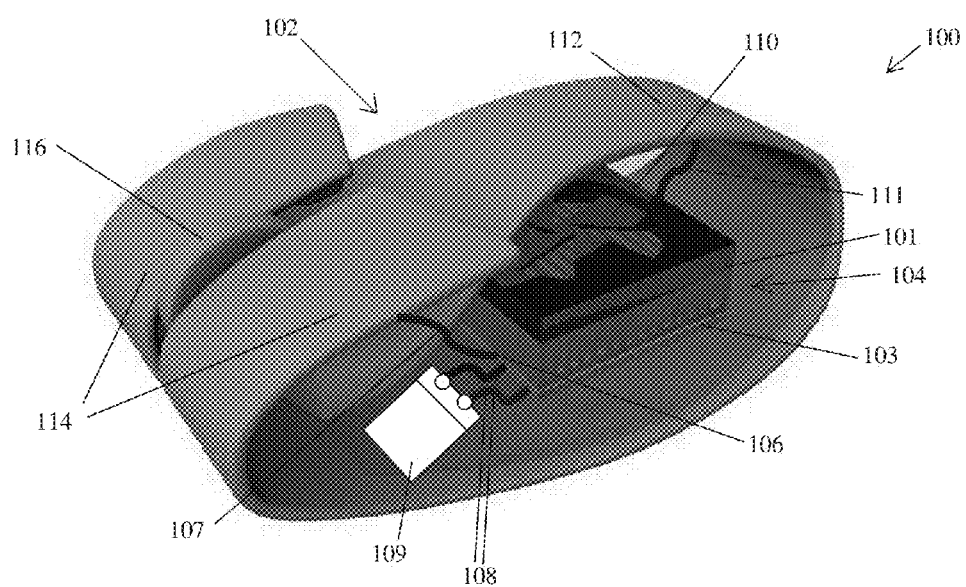
FIG. 1 illustrates a thermal electric cooler ("TEC") coupled to a computer input device in accordance with at least one exemplary embodiment.

To overcome the aforementioned obstacles, a system and an apparatus is disclosed. FIG. 1 illustrates a system 100 comprising a thermal electric cooler ("TEC") 104 coupled to a computer input device 102 in accordance with at least one embodiment. As shown, the computer input device 102 is a computer mouse with a section of the housing cut away for illustration purposes. However, in various embodiments the computer input device comprises a keyboard, a joystick, or another computer input device known to those with skill in the art. The TEC 104 is preferably adapted to regulate the temperature of the computer input device 102 via conduction. In at least one embodiment, the TEC 104 resides inside the computer input device 102. A discussion of TECs will be helpful.

TECs are solid state heat pumps that operate on the Peltier effect, a heating or cooling effect brought about via electric current passing through two conductors that are components of the TEC. Specifically, a voltage applied to the free ends of two dissimilar conductors coupled together creates a temperature difference. Because of the temperature difference, heat moves from one end of the coupled conductors to the other. One face of the TEC, therefore, will be cooled while the opposite face is simultaneously heated. Consequently, a TEC can be used for both heating and cooling by using one face for heating and the other face for cooling or by reversing polarity within the TEC, causing a change in the direction of the applied current, and hence, a change in the direction of heat transfer.

A TEC comprises an array of p-type and n-type semiconductor elements, e.g. bismuth telluride, as the two conductors. The array of elements is soldered electrically in series and thermally in parallel between two ceramic plates. As direct current ("DC") passes through the semiconductor elements from n-type to p-type, there is a decrease in temperature at the ceramic plate coupled with the n-type elements ("cold face") resulting in the absorption of heat. The heat is carried through the coupled conductors by electron transport and released on the opposite ceramic plate ("hot face") as heat as the electrons move from a high to low energy state due to the p-type elements. The heat is dissipated into a heat sink, released into the surrounding environment via a fan, or both. The heat pumping capacity of the TEC is proportional to the magnitude of current and the number n-type and p-type elements.

TECs operate from a DC power input. DC power supplies compatible with TECs can range from simple batteries to sophisticated closed loop temperature control/power supply circuits. Both linear and switching power supplies can be used to operate TECs.

Preferably, the TEC 104 comprises a thermal conducting portion 106 coupled to the computer input device 102. The thermal conducting portion 106 couples the TEC 104 to the computer input device 102 and transfers thermal energy between the TEC 104 and the computer input device 102. In at least one embodiment, a single thermal conducting portion 106 provides selective heating or cooling. The thermal conducting portion is coupled to either face 101, 103 of the TEC 104, and current in the TEC 104 is reversed in order to switch between heating and cooling.

In at least one embodiment, the TEC 104 cools the computer input device 102 when the thermal conducting portion 106 couples the cold face 103 of the TEC 104 with the computer input device 102. Hence, the TEC 104 is adapted to cool the computer input device 102 below ambient temperature via conduction. As such, heat flows out of the computer input device 102, through the thermal conducting portion 106, and is dissipated by the TEC 104. As such, the thermal conducting portion 106 preferably comprises a material that conducts thermal energy well.

In order to simultaneously heat the computer input device 102 without reversing polarity, a second thermal conducting portion 111 is coupled between the hot face 101 of the TEC 104 and the computer input device 102. The second thermal conducting portion 111 also transfers thermal energy between the computer input device 102 and the TEC 104. Hence, the TEC 104 is also adapted to heat the computer input device 102 above the ambient temperature via conduction.

In at least one embodiment, the TEC 104 is adapted to heat a first portion of the computer input device above the ambient temperature via conduction and simultaneously cool a second portion of the computer input device below the ambient temperature via conduction. As shown in FIG. 1, the TEC 104 is adapted to cool a mouse button 114 and heat the palm rest 112.

In at least one embodiment, the direction of current is reversed even though two thermal conducting portions 106, 111 are used. As such, the portion of the computer input device 102 which was heated is now cooled and vice versa. As those having skill in the art will appreciate, one or more thermal conducting portions 106, 111 can be coupled from the TEC 104 to the computer input device 102 to provide thermal regulation to the computer input device 102 in a myriad of combinations. In at least one embodiment, thermal conducting portions 106 are coupled from the both faces 103, 101 of the TEC 104 to the palm rest 112, the buttons 114, and the scroll wheel 116.

As mentioned, the temperature regulation of the computer input device 102 is based on current direction and current magnitude in the TEC 104. The current direction determines which face of the TEC is hot and which face is cold. A higher current magnitude results in a colder cold face and hotter hot face because more thermal energy is transported from one side of the TEC 104 to the other. Thus, adjusting the direction and magnitude of current in the TEC 104 adjusts the temperature of the computer input device 102. In at least one embodiment, the TEC 104 receives power from a battery 109. Leads 108 enable the TEC 104 to couple to the battery 109.

Preferably, the TEC 104 comprises a fan 110 to dissipate excess heat produced by the TEC 104. As mentioned above, in at least one embodiment, a heatsink is used instead of, or in combination with, the fan 110.

Figure 2:
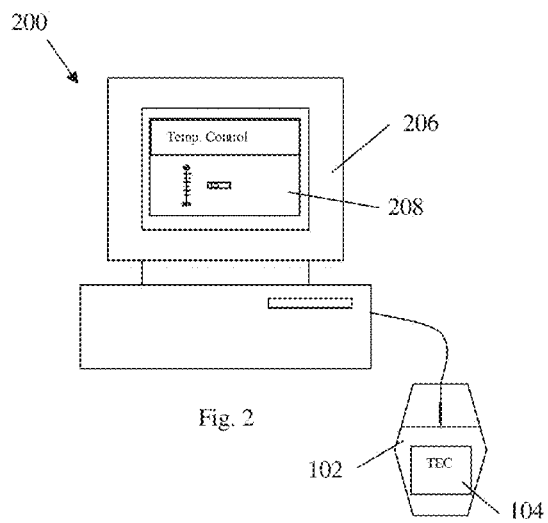
FIG. 2 illustrates a system comprising a computer, a computer input device, and a TEC in accordance with at least one exemplary embodiment.
Figure 2A:
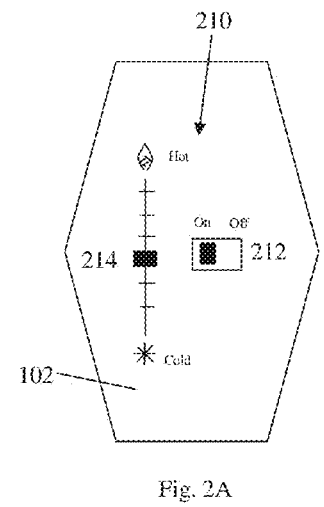
FIG. 2A illustrates the computer input device in an exploded view in accordance with at least one exemplary embodiment.
Figure 3:
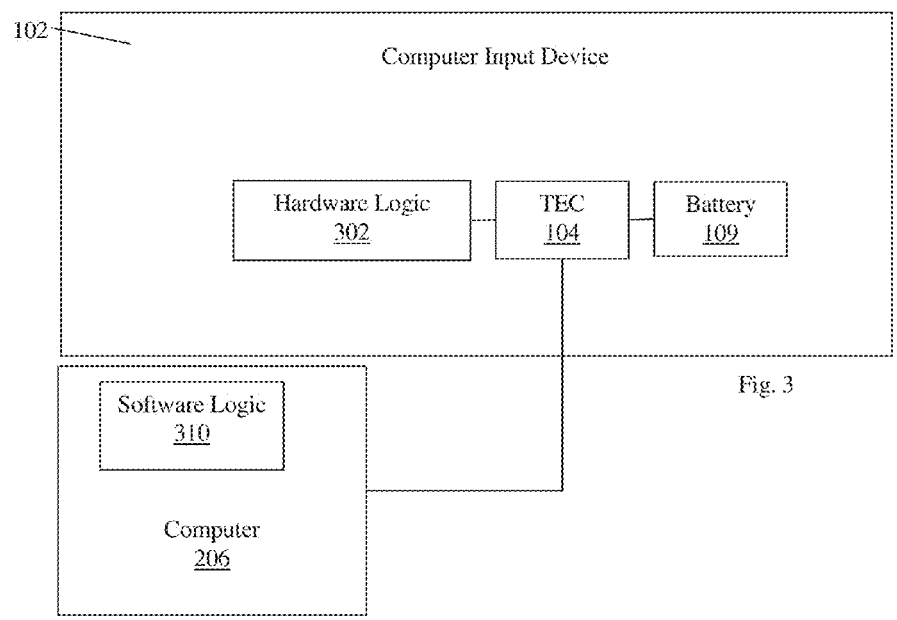
FIG. 3 illustrates a computer input device in block diagram format in accordance with at least one exemplary embodiment.

FIG. 2 illustrates a system 200 comprising a computer 206, a computer input device 102, and a TEC 104 in accordance with at least one exemplary embodiment. FIG. 2A illustrates the reverse of the computer input device 102 in an exploded view in accordance with at least one exemplary embodiment. FIG. 3 illustrates a computer input device 102 in block diagram format in accordance with at least one exemplary embodiment. Thermal regulation of the computer input device 102 is achieved via electrical regulation of the TEC 104, i.e. adjusting voltage and current within the TEC 104. Logic, implemented in software or hardware, is preferably used for electrical regulation of the TEC 104 according to predefined rules. For example, software logic directs the TEC 104 to cool the palm portion of the computer input device 102 by five degrees after continuous use of the computer input device 102 for over an hour. Preferably, the computer 206 comprises software logic 310 wherein the rules can be defined and voltage and current can be adjusted via a graphical user interface 208.

Continuing the example, upon sensing the automatic activation of the TEC 104, a user deactivates the TEC 104 via hardware logic 302. Preferably, the hardware logic 302 is implemented as circuitry within the computer input device 102. Also, the user preferably can easily manipulate the circuitry via controls 210. For example, by flipping a switch 212 located underneath the computer input device 102, the user may cut power to the hardware logic 302, ceasing any heating or cooling. As another example, the user may adjust a slider 214 to regulate current and voltage within the TEC 104, and hence regulate the temperature of the computer input device 102.

In at least one embodiment, the TEC 104 receives power from the computer 206. In such an embodiment, the TEC 104 uses the battery 109 as a backup power supply or is not coupled to a battery 109 at all. In at least one embodiment, both methods of powering the TEC 104 are implemented, with either method acting as a backup to the other method.

The above disclosure is meant to be illustrative of the principles and various embodiments of the present invention. Numerous variations and modifications will become apparent to those skilled in the art once the above disclosure is fully appreciated. It is intended that the following claims be interpreted to embrace all variations and modifications.

We claim:

1. A system, comprising:
   a thermal electric cooler ("TEC"); and
   a computer input device coupled to the TEC;
   wherein the TEC is adapted to regulate a temperature of the computer input device via conduction;
   wherein the computer input device is adjustable by a user to at least two settings of heat or two settings of coolness, the at least two settings not comprising an off setting; and
   wherein the TEC is adapted to heat a first portion of the computer input device above an ambient temperature via conduction and simultaneous cool a second portion of the computer input device below the ambient temperature via conduction.

2. The system of claim 1, further comprising a thermal conducting portion coupling the TEC to the computer input device.

3. The system of claim 1, wherein temperature regulation of the computer input device is based on current direction and current magnitude in the TEC.

4. The system of claim 1, wherein the TEC is adapted to switch from cooling the computer input device to heating the computer input device when a direction of current supplied to the TEC is reversed.

5. The system of claim 1, wherein the TEC is adapted to reside inside the computer input device.

6. The system of claim 1, wherein the computer input device is adapted to adjust the temperature of the computer input device via hardware located on the computer input device, the hardware adjusting voltage and current in the TEC.

7. The system of claim 1, further comprising a computer coupled to the computer input device.

8. The system of claim 7, wherein the computer comprises software adapted to adjust the temperature of the computer input device, the software adjusting voltage and current in the TEC.

9. The system of claim 1, wherein power is supplied to the TEC via a computer coupled to the computer input device.

10. The system of claim 1, wherein power is supplied to the TEC via a battery coupled to the TEC.

11. A system, comprising:
    a computer input means for inputting data into a computer; and
    a temperature regulation means for regulating a temperature of the computer input means;
    wherein the temperature regulation means is adapted to regulate the temperature of the computer input means via conduction;

wherein the computer input means comprises an adjustment means, adjustable by a user to multiple settings of heat or coolness, to regulate the temperature regulation means; and wherein the temperature regulation means is adapted to heat a first portion of the computer input means above an ambient temperature via conduction and simultaneously cool a second portion of the computer input means below the ambient temperature via conduction.

12. The system of claim 11, further comprising a thermal conducting means for conducting thermal energy between the temperature regulation means and the computer input means.

13. The system of claim 11, further comprising an adjusting means for adjusting voltage and current in the temperature regulation means, wherein temperature regulation of the computer input means is based on current direction and current magnitude in the temperature regulation means.

14. The system of claim 11, further comprising a powering means for powering the temperature regulation means.

15. An apparatus, comprising:

a TEC coupled to a computer input device, the TEC adapted to selectively cool the computer input device below ambient temperature via conduction and heat the computer input device above the ambient temperature via conduction; and a thermal conducting portion coupling the TEC to the computer input device;

wherein the computer input device is adjustable by a user to at least three settings of thermal activity, the at least three settings not comprising an off setting; and wherein the TEC is adapted to heat first portion of the computer input device above an ambient temperature via conduction and simultaneously cool a second portion of the computer input device below the ambient temperature via conduction.

* * * * *

UNITED STATES PATENT AND TRADEMARK OFFICE
CERTIFICATE OF CORRECTION

| | | |
|---|---|---|
| PATENT NO. | : 8,612,064 B2 | Page 1 of 1 |
| APPLICATION NO. | : 12/864129 | |
| DATED | : December 17, 2013 | |
| INVENTOR(S) | : Trentent Tye et al. | |

It is certified that error appears in the above-identified patent and that said Letters Patent is hereby corrected as shown below:

In the Claims

In column 4, line 30, in Claim 1, delete "simultaneous" and insert -- simultaneously --, therefor.

In column 6, line 13, in Claim 15, after "heat" insert -- a --.

Signed and Sealed this
Twentieth Day of May, 2014

Michelle K. Lee
*Deputy Director of the United States Patent and Trademark Office*